R. McFARLANE.
SCALE.
APPLICATION FILED JAN. 28, 1911. RENEWED OCT. 3, 1912.
1,072,390.
Patented Sept. 2, 1913.
2 SHEETS—SHEET 1.
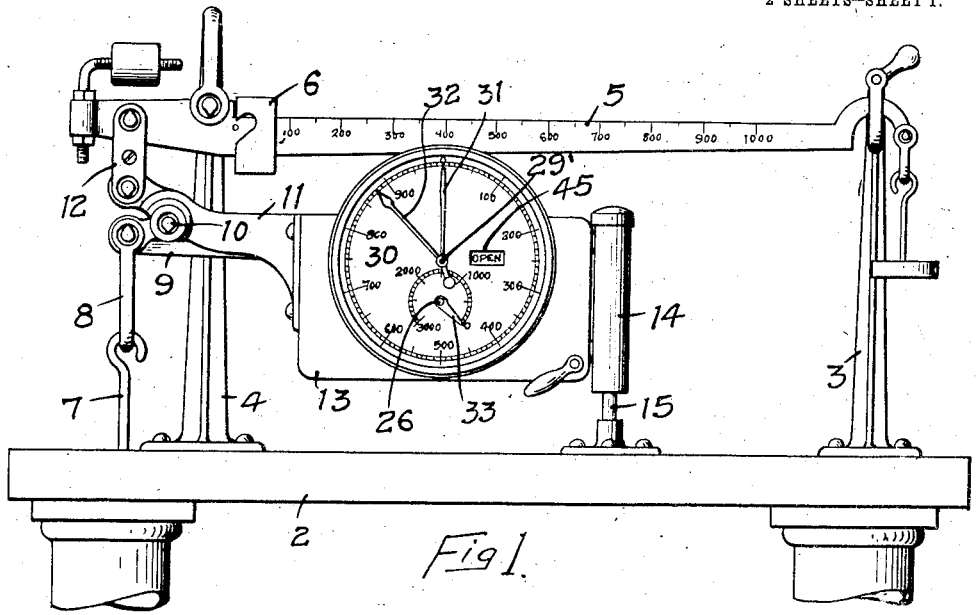
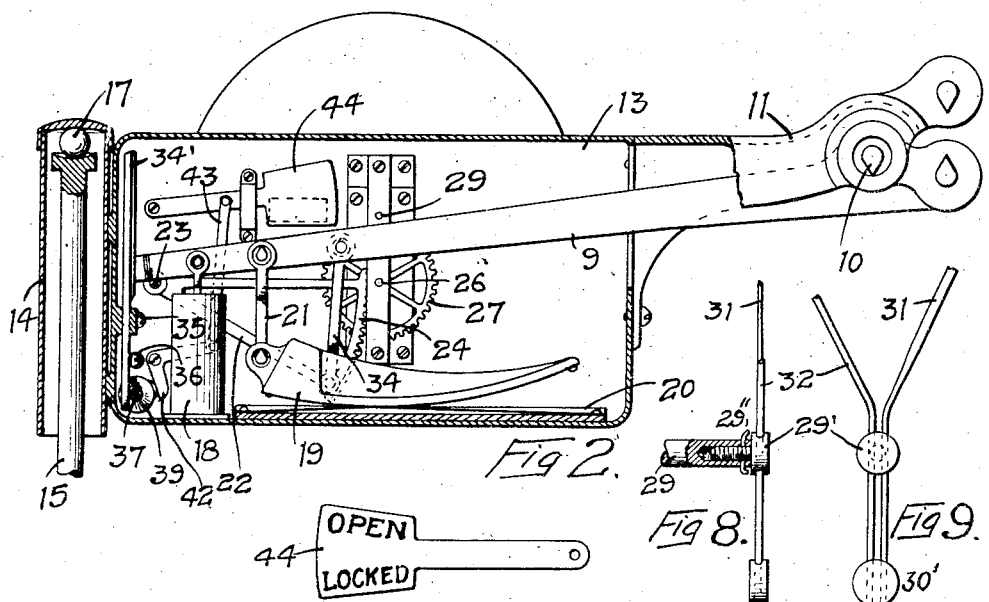
WITNESSES
A. W. Walstrom
E. A. Paul
INVENTOR
ROBERT McFARLANE
BY Paul & Paul
ATTORNEYS R. McFARLANE.
SCALE.
APPLICATION FILED JAN. 28, 1911. RENEWED OCT. 3, 1912.
1,072,390.
Patented Sept. 2, 1913.
2 SHEETS—SHEET 2.
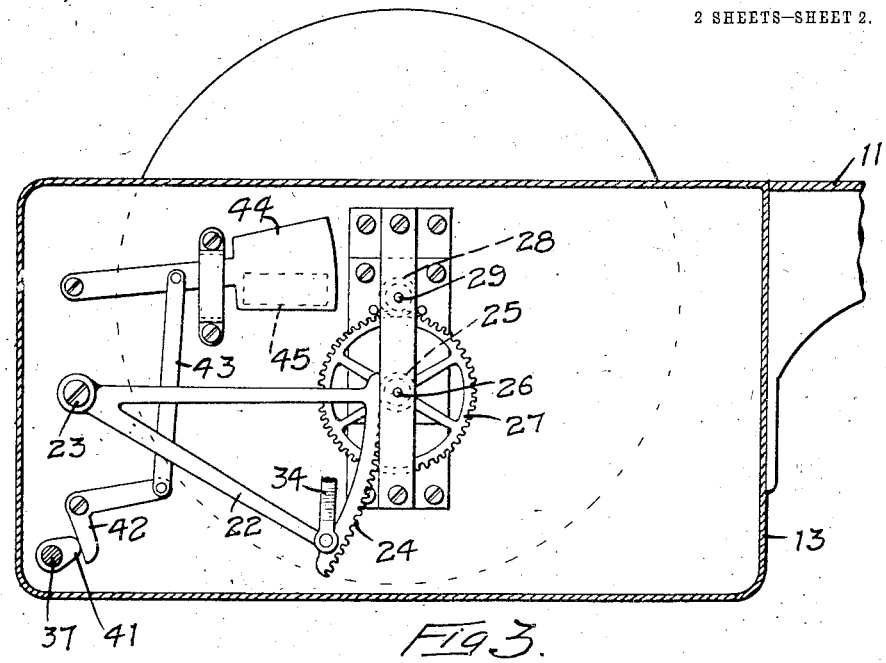
Fig 3.
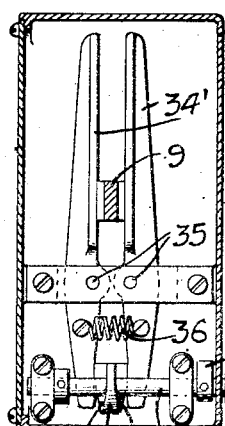
Fig 4.
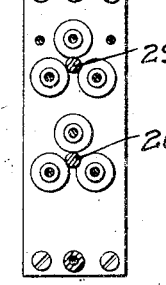
Fig 6. X-X
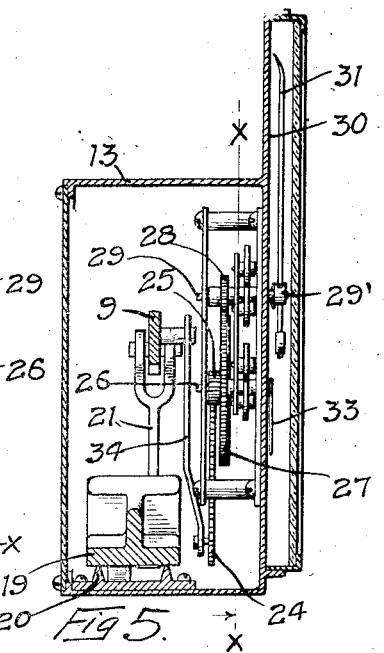
Fig 5.
WITNESSES
OMWalstrom
E. A. Paul
INVENTOR
ROBERT McFARLANE
BY Paul & Paul
ATTORNEYS

UNITED STATES PATENT OFFICE.

ROBERT McFARLANE, OF MINNEAPOLIS, MINNESOTA, ASSIGNOR TO McFARLANE MANUFACTURING COMPANY, OF CHICAGO, ILLINOIS, A CORPORATION OF ILLINOIS.

SCALE.

1,072,390.     Specification of Letters Patent.     Patented Sept. 2, 1913.

Application filed January 28, 1911, Serial No. 605,322. Renewed October 3, 1912. Serial No. 723,815.

*To all whom it may concern:*

Be it known that I, ROBERT McFARLANE, of Minneapolis, Hennepin county, Minnesota, have invented certain new and useful Improvements in Scales, of which the following is a specification.

The object of my invention is to improve the apparatus shown and described in my pending applications for Letters Patent of the United States filed April 27, 1910, Serial No. 558,483, and October 17, 1910, Serial No. 587,547.

The invention consists generally in means whereby the operator of a truck load of merchandise can at a glance determine the weight of the load on the truck without the necessity of making a mental or mechanical deduction of the weight of the truck from the total weight of the load on the scale platform.

Further the invention consists in means for locking the beam to allow the load to be removed from the platform without affecting the position of the beam or pointer.

Further the invention consists in an indicating device by which the operator can readily determine whether the beam is in its locked or unlocked condition.

Further the invention consists in various constructions and combinations, all as hereinafter described and particularly pointed out in the claims.

In the accompanying drawings forming part of this specification, Figure 1 is a front view of the upper portion of a platform scale with my invention applied thereto, Fig. 2 is a detail sectional view showing the arrangement of the auxiliary or supplementary beam and its connections, Fig. 3 is a sectional view showing the mechanism between the beam and the indicator hand, Fig. 4 is a transverse sectional view illustrating the mechanism for clamping and locking the beam, Fig. 5 is a similar view through the middle portion of the auxiliary beam casing showing the substitute for the yielding or spring connection to the beam, Fig. 6 is a sectional view on the line $x$—$x$ of Fig. 5. Fig. 7 is a detail view of the signal plate by means of which the operator can determine whether the beam is locked or released, Figs. 8 and 9 are detail views of the indicator hands.

In the drawing, 2 represents the upper portion of a platform scale of any ordinary or preferred construction, having standards 3 and 4 thereon, the latter supporting the scale beam 5, graduated in the usual way and provided with the usual poise weight 6.

7 is a connecting rod extending to the platform levers, as usual in scales of this kind, the levers and platform being omitted from the drawing, as they form no part of my present invention. This rod, instead of being connected directly to the short arm of the beam 5, as usual, has a pivotal connection 8 with the short arm of an auxiliary beam or lever 9 pivoted at 10 on a hanger or lever 11 that is connected with the short arm of the beam 5 by a link 12. This hanger preferably extends under the main scale beam substantially parallel therewith and supports a suitable casing 13 into which the lever or beam 9 projects and oscillates vertically; the hanger and casing being normally stationary. The end of the casing opposite from its point of connection with the main beam is provided with a supporting means preferably a tubular member 14 adapted to receive a standard 15 that is mounted on the part 2, the top of said standard having a head or cap which is provided with a concave upper surface to receive a bearing ball 17 which fits a similar surface provided in the upper end of the tube 14. This ball and standard support the casing in a normal, horizontal position and allow a slight oscillation thereof to accommodate the lever 9 and prevent cramping or binding of the pivots of said lever and the connections with the platform levers and the main beam of the scale. So far the apparatus described corresponds substantially to what is shown in my applications above referred to.

A dash-pot device 18 is provided in the casing 13 and pivotally connected with the lever 9 to regulate its movement and in place of the spring usually employed to afford a yielding resistance to the movement of the lever 9, I prefer to provide a weight device 19 having a curved under surface that is adapted to rock on the knife edge bearings 20 provided in the bottom of the casing 13. This weight is pivotally connected by a link 21 with the lever 9. The weight is so proportioned that as the lever or beam 9 swings upwardly and the weight is tilted on its bearings, the load on the link 21 will increase as the weight is tilted correspondingly to the increasing resistance of a spring as it is put under tension. A sector shaped member is preferably pivoted at 23 on the casing and is provided with a curved rack bar 24 which meshes with a pinion 25 on a stud 26 which carries a gear wheel 27. This wheel meshes with a pinion 28 on a stud 29. The studs 26 and 29 project through the face of a graduated dial 30 and indicator hands 31 and 32 are mounted on the stud 29 and are adapted to move over the graduations on the dial, indicating the weight in pounds preferably up to 1000 pounds, graduated in tens from zero to one thousand. A secondary dial or series of graduations is provided, indicating thousands, and a hand 33 is mounted on the post 26 and indicates the weight on the platform in thousands of pounds. A link 34 connects the beam with the sector 22 so that upward movement of the beam or lever will be communicated through the link and sector to the indicator hands. The hand 31 is normally set at zero and the hand 32 a distance reading backward from zero sufficient to indicate the weight of the empty truck, in this case 120 pounds. If then a loaded truck is moved on to the scale platform the hand 32 will move forward past the zero point until the scale balances when it will point to the true weight of the load, less the truck. For instance, if there were 150 pounds of merchandise on the truck, the hand 32 would move half way between the 100 and 200 pound graduations at the right of the zero mark and the clerk or operator without any mental subtraction of the weight of the truck and without the use of a pencil can determine at a glance the weight of the merchandise. If the truck is heavier or lighter than for what the hand 32 is set, the hand may be moved backward or forward on the dial until it points to the proper graduation. If there is a load on the platform without any truck, the indicator hand 31 will be used to determine the weight.

I prefer in this apparatus to provide means to allow the indicator hand 31 to revolve three times over its graduations and in so doing the indicator hand 33 will be moved over its graduations to indicate the sum of two or more revolutions of the indicator hand 31. For instance, if the load on the scale weighed 2000 pounds, the hand 31 would make two revolutions and stop at zero and at the same time the hand 33 would be moved opposite the 2000 pound graduation on its dial and the operator would understand that this represented the weight of the load.

I have found it desirable in an apparatus of this kind to provide some means for locking the lever or beam 9 when the weight has been ascertained, so that the load may be removed from the platform and a correct reading of the dial obtained thereafter. With this end in view I provide jaws 34' pivoted preferably at 35 at one end of the casing and straddling the lever or beam 9. These jaws are normally held apart by a spring 36. A rock shaft 37 is mounted in the casing and provided with an operating handle 38 and a block 39 is mounted on said shaft and projects between the lower ends of the jaws 34 and has cam surfaces 40 which engage said jaws and force their lower ends apart, causing their upper portions to grip the lever 9 and hold it securely in the position it may have assumed when the load was placed on the platform. When this has been done, the load may be removed, the lever 9 will remain stationary and the indicator hands will point to the weight of the load on the dial and allow a notation to be made of such weight, even though the scale platform is free of its load. I also prefer to provide means for indicating whether the lever 9 is in its locked or released position and for this purpose I mount a cam 41 on the shaft 37 in position to engage one arm of a bell crank 42 that is pivoted on the wall of the casing and is connected by a link 43 with an indicating plate 44 that is also pivoted at one end of the casing and has a face bearing the words "Open" and "Locked", that is adapted to move back and forth in the rear of a slot 45 in the dial. The locking of the lever 9 will swing this plate until the word "Locked" is visible through the slot 45, and upon releasing the lever 9 the plate 44 will drop and expose the word "Open." The scale operator will thus understand that the lever 9 has been released and that the scale is ready to receive another load.

The manner of supporting the rocking weight may be modified in various ways, and the details of the mechanism shown herein may be changed without departing from the scope of my invention.

In Figs. 8 and 9 I have shown a preferred manner of mounting the indicator hands 31 and 32, which consists in tapping the end of the stud 29 to receive a screw 29' that is locked in the stud by a pin 29''. The head of the screw is provided with holes to receive the hands 31 and 32, which are preferably formed of wire or similar material that is capable of being bent to separate the hands or draw them together, the hands, when bent, remaining in that position until another adjustment is desired. One hand may thus be set at zero and the other hand at a point back of the zero mark to compensate for the weight of the truck, any variation in the weights of the trucks being accounted for by further bending of one of the hands. The wire hands or indicators preferably extend beyond the head of the supporting screw with their ends held in parallel relation substantially with one another by a disk or button 30'. This manner of mounting the indicator hands insures a rigid support for them which will not be affected by the jarring of the scale incidental to the placing of goods on the platform or removing them, and at the same time a quick and convenient adjustment of the indicator hands is obtained.

Claims.

1. In a platform scale, the combination, of a poise controlled weighing beam, a beam rod adapted for connection to the scale levers, a lever actuated scale interposed in said beam rod and having means for yieldingly resisting movement of its lever and means for locking said last named lever to prevent it from returning to its normal position when the load is removed from said scale levers.

2. In a platform scale, the combination, of a poise controlled weighing beam, a beam rod, levers interposed in said beam rod, means yieldingly resisting relative movement of said levers, a pointer actuated by said levers for indicating the load on the scale, and means for locking one of said interposed levers to prevent it and said pointer from returning to their normal position when the load is removed from said platform.

3. In a platform scale, the combination, of a poise controlled weighing beam, a beam rod, levers interposed in said rod, means yieldingly resisting relative movement of said levers, a pointer actuated by said levers for indicating the load on the scale, and clamping jaws arranged to engage and lock one of said interposed levers.

4. In a platform scale, the combination, of a poise controlled weighing beam, a beam rod, levers interposed in said rod, means yieldingly resisting relative movement of said levers, a pointer actuated by said levers for indicating the load on the scale, jaws arranged to straddle one of said levers, and means actuating said jaws to grip said lever.

5. A scale comprising a pivoted lever, a second lever pivotally supported on said first named lever and having means for connection with a load support, means yieldingly resisting relative movement of said levers, a weight indicator carried by the long arm of one lever and operatively connected with the corresponding arm of the other lever, and clamping jaws between which one of said levers is normally movable.

6. A weighing scale comprising a pivotally supported lever, a beam or second lever pivotally supported on said first named lever and having means for connection with a platform or load support, means yieldingly resisting relative movement of said levers, a dial and indicator hand carried by one of said levers, means operatively connecting said indicating hand with the other lever and means for locking one of said levers to prevent the indicator hand from returning to zero on the dial when the load is removed from the scale platform.

7. A scale comprising a pivoted lever, a second lever pivotally supported on said first named lever, the short arm of said second lever having means for connection with a load support, a weight interposed between the long arms of said levers and resisting relative movement thereof, a weight indicator carried by the long arm of one lever and operatively connected with the corresponding arm of the other lever, and means for locking one of said levers to prevent said weight indicator from returning to its normal or zero position when the load is removed from its support.

8. A scale comprising a pivoted lever, a second lever pivotally supported on said first named lever, the short arm of said second lever having means for connection with a load support, means yieldingly resisting relative movement of said levers, a weight indicator carried by the long arm of one lever and operatively connected with the corresponding arm of the other lever, clamping jaws between which one of said levers is normally movable, and a cam device for moving said jaws to their clamping or locking position.

9. A scale comprising a weighing beam, a hanger or lever suspended thereon, a casing carried by said lever, a dial mounted on said casing, an indicator hand, an auxiliary beam or lever pivoted on said hanger and having a limited swinging movement in said casing; means yieldingly resisting relative movement of said levers, means operatively connecting said auxiliary beam or lever with said indicator hand, a platform connection attached to said auxiliary beam, and clamping jaws mounted in said casing and between which said beam is normally movable.

10. In a scale, a poise controlled weighing beam, a rod for connection with a load support, a weighing mechanism interposed between said rod and said beam, said weighing mechanism including a graduated scale and pointer operating to indicate the weight of the load on said support independently of said beam, the subsequent balancing of said beam checking or verifying the weight indicated by said mechanism, and clamping jaws arranged to lock said weighing mechanism to prevent said pointer from returning to its normal position when the load is removed from its support.

11. In a platform scale, the combination, of a poise controlled weighing beam, a beam rod, levers interposed in said rod, means yieldingly resisting relative movement of said levers, a pointer actuated by said levers for indicating the load in the scale, means for locking one of said levers to prevent it and said pointer from returning to their normal position when the load is removed from the scale, and a signal device arranged to indicate the locked or released condition of said levers.

12. A weighing scale comprising a pivotally supported lever, a beam or second lever pivotally supported on said first named lever having means for connection with a platform or load support, means yieldingly resisting relative movement of said levers, a dial and indicator hand carried by one of said levers, means operatively connecting said indicating hand with the other lever, means for locking one of said levers and said indicator hand in the position to which it is moved when a load is placed on the platform, and a visual signal actuated by the movement of said locking device to indicate the locked or unlocked condition of said lever.

13. A weighing scale comprising a pivotally supported lever, a beam or second lever pivotally supported on said first named lever and having means for connection with a platform or load support, means yieldingly resisting relative movement of said levers, a dial and indicator hand carried by one of said levers, means operatively connecting said indicator hand with the other lever, a locking means for one of said levers, a plate forming a visual signal connected with said locking means, said plate bearing the words "Open" and "Locked" and indicating to the operator the condition of said lever.

14. A scale comprising a weighing beam, a hanger or lever suspended thereon, a casing carried by said hanger, a dial mounted on said casing, and provided with an opening therein, an indicator hand, an auxiliary beam or lever pivoted on said hanger and having a limited swinging movement in said casing, means yieldingly resisting relative movement of said levers, means operatively connecting said auxiliary beam or lever with said indicator hand, a platform connection attached to said auxiliary beam, a locking device for said auxiliary beam, a plate pivoted in said casing and adapted to swing past said dial opening, said plate being marked to indicate the locked or released condition of said auxiliary beam, and means operatively connecting said plate with said locking device.

15. In a scale, a poise controlled weighing beam, a rod for connection with a load support, a weighing mechanism interposed between said rod and beam, and including relatively movable pivoted levers, a graduated scale and pointer operating to indicate the weight of the load on said support, and a weight carried by one of said levers and pivotally connected with the other lever.

16. In a scale, a poise controlled weighing beam, a rod for connection with a load support, a weighing mechanism interposed between said rod and beam, and including relatively movable pivoted levers, a graduated scale and pointer operating to indicate the weight of the load on said support, and a rocking weight carried by one of said levers and pivotally connected with the other lever.

In witness whereof, I have hereunto set my hand this 27th day of December, 1910.

ROBERT McFARLANE.

Witnesses:
GENEVIEVE E. SORENSEN,
EDWARD A. PAUL.